United States Patent
Li et al.

(10) Patent No.: US 10,673,535 B2
(45) Date of Patent: Jun. 2, 2020

(54) OPTICAL RECEIVER WITH THREE DATA SLICERS AND ONE EDGE SLICER

(71) Applicant: Hewlett Packard Enterprise Development LP, Houston, TX (US)

(72) Inventors: Cheng Li, Palo Alto, CA (US); Kunzhi Yu, Palo Alto, CA (US); Marco Fiorentino, Mountain View, CA (US); Raymond G. Beausoleil, Seattle, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/085,364

(22) PCT Filed: Apr. 14, 2016

(86) PCT No.: PCT/US2016/027467
§ 371 (c)(1),
(2) Date: Sep. 14, 2018

(87) PCT Pub. No.: WO2017/180122
PCT Pub. Date: Oct. 19, 2017

(65) Prior Publication Data
US 2019/0089466 A1     Mar. 21, 2019

(51) Int. Cl.
*H04B 10/69*    (2013.01)
*H04B 10/516*   (2013.01)
(Continued)

(52) U.S. Cl.
CPC ..... *H04B 10/6931* (2013.01); *H04B 10/5161* (2013.01); *H04B 10/63* (2013.01); *H04L 25/4917* (2013.01); *H04B 10/695* (2013.01)

(58) Field of Classification Search
CPC .................................................. H04B 10/695
See application file for complete search history.

(56) References Cited

U.S. PATENT DOCUMENTS 8,798,484 B2    8/2014 Proesel et al.
9,215,114 B2   12/2015 Emami-Neyestanak et al.
(Continued)

FOREIGN PATENT DOCUMENTS

EP          2624511          8/2013
WO    WO-2014141260 A1      9/2014

OTHER PUBLICATIONS

Toifl, T. et al.; "A 22-Gb/s PAM-4 Receiver in 90-nm CMOS SOI Technology"; Apr. 2006; pp. 954-965.
(Continued)

*Primary Examiner* — Shi K Li
(74) *Attorney, Agent, or Firm* — Hewlett Packard Enterprise Patent Department

(57) ABSTRACT

An example optical receiver may have an optical receiver front-end, four slicers, and a logic block. The optical receiver front-end may include a transimpedance amplifier to convert a photodiode output signal to a voltage signal. Three of the slicers may be data slicers, and one of the slicers may be an edge slicer. The slicers may each: shift the voltage signal based on an offset voltage set for the respective slicer, determine whether the shifted voltage signal is greater than a threshold value and generate a number of comparison signals based on the determining, and generate multiple digital signals by demuxing the comparison signals. The logic block may perform PAM-4 to binary decoding based on the data signals output by the data slicers and clock-and-data-recovery based on the digital signals output by the edge slicer.

9 Claims, 9 Drawing Sheets

(51) Int. Cl.
*H04B 10/63* (2013.01)
*H04L 25/49* (2006.01)

(56) References Cited

U.S. PATENT DOCUMENTS

| | | | |
|---|---|---|---|
| 2003/0011854 A1* | 1/2003 | Kahn | H04B 10/5161 |
| | | | 398/141 |
| 2004/0119543 A1* | 6/2004 | Denoyer | H03F 3/08 |
| | | | 330/308 |
| 2004/0141567 A1* | 7/2004 | Yang | H03L 7/087 |
| | | | 375/287 |
| 2005/0147418 A1 | 7/2005 | Gurusami et al. | |
| 2011/0311008 A1 | 12/2011 | Slezak et al. | |
| 2012/0177381 A1* | 7/2012 | Dobbelaere | H01L 21/84 |
| | | | 398/139 |
| 2013/0241622 A1 | 9/2013 | Zerbe et al. | |
| 2015/0256363 A1 | 9/2015 | Shvydun et al. | |
| 2017/0187552 A1* | 6/2017 | Sakai | H04L 25/062 |

OTHER PUBLICATIONS

Yu et al., "56 Gb/s PAM-4 optical receiver frontend in an advanced FinFET process," 2015 IEEE 58th International Midwest Symposium on Circuits and Systems (MWSCAS), Fort Collins, CO, 2015, pp. 1-4.

* cited by examiner

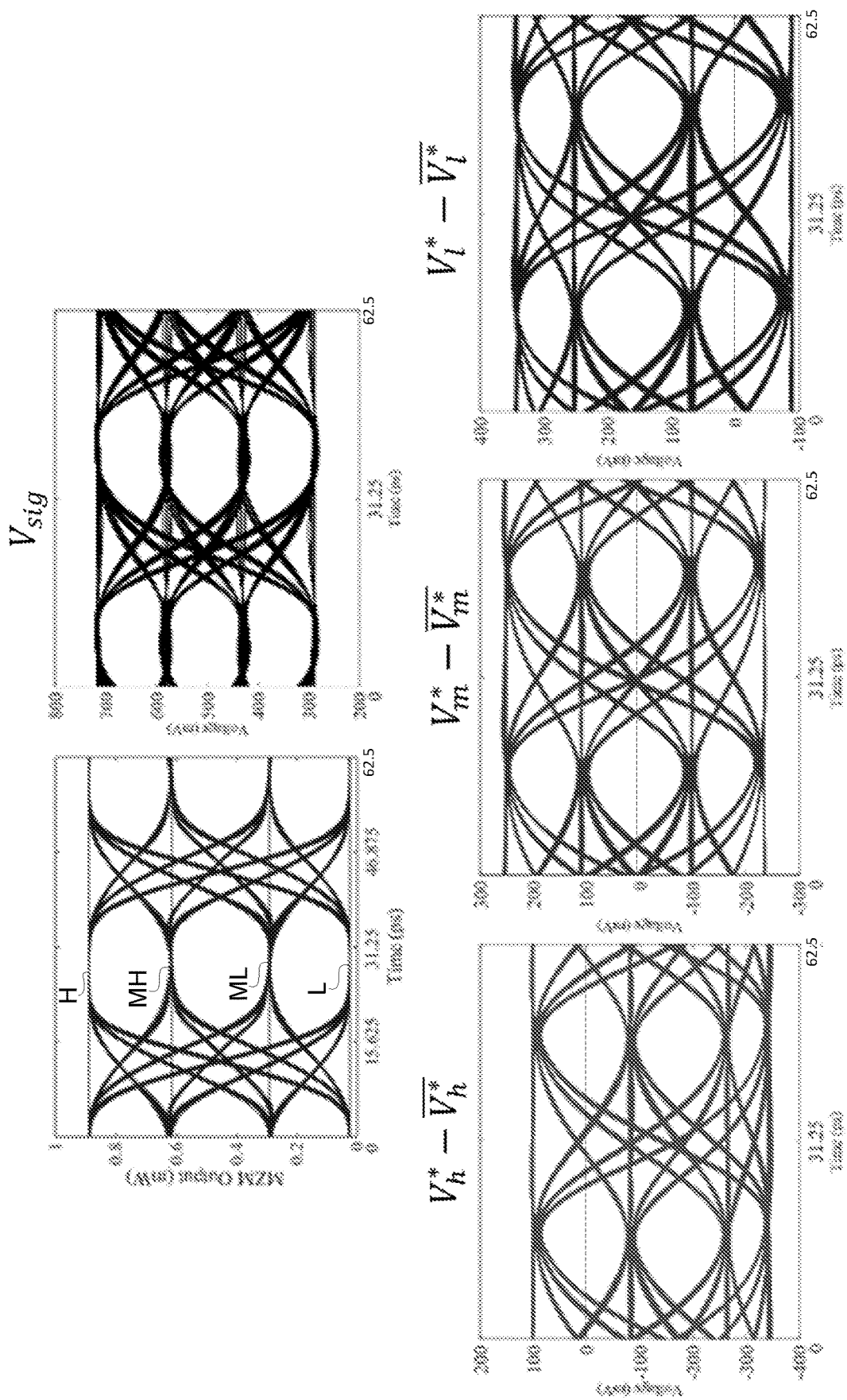

US 10,673,535 B2

OPTICAL RECEIVER WITH THREE DATA SLICERS AND ONE EDGE SLICER

STATEMENT OF GOVERNMENT INTEREST

This invention was made with government support under Contract No. H98230-14-3-0011, awarded by the Maryland Procurement Office. The government has certain rights in the invention.

BACKGROUND

One way that information may be communicated between two devices is by modulating light at one device to form an optical signal and transmitting the optical signal to the other device. One form of modulation that can be used in such optical communication is known as pulse-amplitude modulation (PAM), which, in the context of optical communication, involves modulating the power (intensity) of a light signal so as to encode data for transmission.

PAM-4 is a form of PAM in which, in the context of optical communication, there are four different power levels to which the optical signal may be modulated, each corresponding to a different transmission symbol. Each transmission symbol in a PAM-4 optical signal encodes a sequence of two binary bits, such as 00, 01, 10, and 11.

BRIEF DESCRIPTION OF THE DRAWINGS

FIG. 7 includes example eye diagrams.

DETAILED DESCRIPTION

Disclosed herein are examples of optical receivers that are configured to receive a PAM-4 encoded optical signal and convert the received signal into binary data, such as data in a non-return to zero (NRZ) format.

Throughout this disclosure and in the appended claims, occasionally reference may be made to "a number" of items. Such references to "a number" mean any integer greater than or equal to one. When "a number" is used in this way, the word describing the item(s) may be written with the pluralized "s" for grammatical consistency, but this does not necessarily mean that multiple items are being referred to. Thus, for example, "a number of comparators" could encompass both one comparator and multiple comparators.

Figure 1:
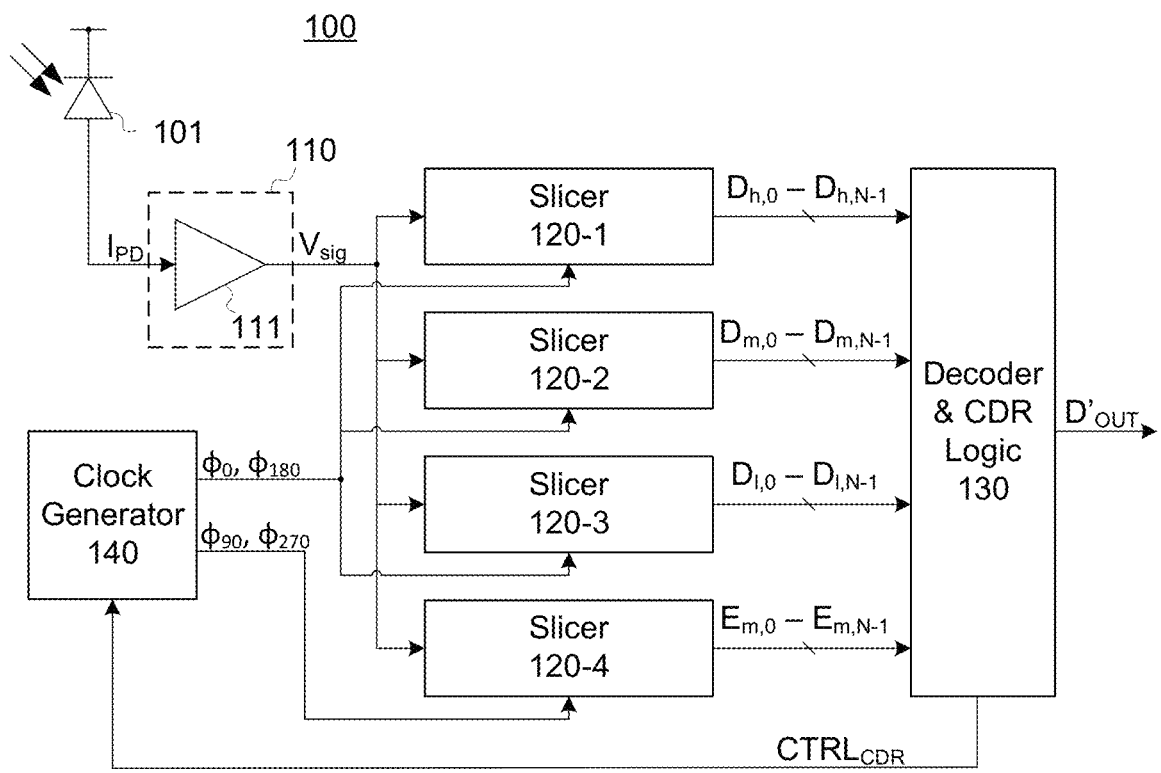
FIG. 1 is a conceptual diagram illustrating an example optical receiver.

FIG. 1 illustrates an example optical receiver 100. The example optical receiver 100 illustrated in FIG. 1 includes an optical receiver front-end 110, a bank of slicers 120, decoder and clock-and-data-recovery (CDR) logic 130, and a clock generator 140.

The optical receiver front-end 110 may include a transimpedance amplifier (TIA) 111. The TIA 111 may receive a photodiode output signal $I_{PD}$ from a photodiode 101, and may convert the photodiode output signal $I_{PD}$ into a voltage signal $V_{sig}$. The photodiode output signal $I_{PD}$ may correspond to a current generated by the photodiode 101 in response to an optical signal received by the photodiode 101. An example of the optical front-end 110 will be discussed in greater detail below with reference to FIG. 2.

The bank of slicers 120 may include three data slicers (e.g., data slicers 120-1, 120-2, and 120-3) and at least one edge slicer (e.g., edge slicer 120-4). The data slicers may be for detecting PAM-4 symbols in the received optical signal, while the edge slicer(s) may be for detecting symbol timings in the received optical signal through a clock-and-data recovery (CDR) process.

In particular, the voltage signal $V_{sig}$ output by the TIA 111 may be input to each of the slicers 120. The slicers 120 may each output N digital signals based on the voltage signal $V_{sig}$, where N is an integer greater than 1. In the example of FIG. 1, the data slicer 120-1 outputs data signals $D_{h,0}$–$D_{h,N-1}$, the data slicer 120-2 outputs data signals $D_{m,0}$–$D_{m,N-1}$, the data slicer 120-3 outputs data signals $D_{l,0}$–$D_{l,N-1}$, and the edge slicer 120-4 outputs edge signals $E_{m,0}$–$E_{m,N-1}$.

The slicers 120 may each shift the voltage signal $V_{sig}$ based on an offset voltage, thereby generating a shifted voltage signal. The offset voltages set for the slicers 120-1, 120-2, 120-3, and 120-4 of the example of FIG. 1 are labeled herein $\Delta V_1$, $\Delta V_2$, $\Delta V_3$, and $\Delta V_4$, respectively. Each of the slicers 120, upon shifting the voltage signal $V_{sig}$ by the offset amount set for the respective slicer 120, may then determine whether its shifted voltage signal is greater than a threshold voltage $V_{TH}$ and generate a number of comparison signals based on the determination. For example, the comparison signals may be logical 1 when the shifted voltage signal is greater than the threshold voltage $V_{TH}$, and logical 0 otherwise. Each of the slicers 120 may then generate its respective N digital signals by demuxing the comparison signals. An example of the slicers 120 will be discussed in greater detail below with reference to FIGS. 3A-3D.

The digital signals output by the slicers 120 are input to the decoder and CDR logic 130. The decoder and CDR logic 130 includes logic for detecting and decoding PAM-4 symbols into binary data and logic for a CDR process. In particular, the decoder and CDR logic 130 detects PAM-4 symbols based on the 3N digital signals output by the three data slicers 120-1, 120-2, and 120-3 (namely, data signals $D_{h,0}$–$D_{h,N-1}$, $D_{m,0}$–$D_{m,N-1}$, and $D_{l,0}$–$D_{l,N-1}$), and decodes the detected PAM-4 symbols into binary data $D'_{OUT}$. The decoder and CDR logic 130 may also use at least the N digital signals output by the edge slicer 120-4 (namely, edge signals $E_{m,0}$–$E_{m,N-1}$) for edge detection in the CDR process. An example of the decoder and CDR logic 130 will be discussed in greater detail below with respect to FIGS. 4A-4C.

The clock generator 140 may generate clock signals for use by the slicers 120. For example, in the example optical receiver shown in FIG. 1, the clock generator 140 generates a clock $CLK\phi_0$ that has a frequency that is half of a symbol rate of the received optical signal. In this example, the optical receiver also generates a clock $CLK\phi_{90}$ that has the same frequency as the clock $CLK\phi_0$ and a 90 degree phase difference from the clock $CLK\phi_0$, a clock $CLK\phi_{180}$ that has the same frequency as the clock $CLK\phi_0$ and a 180 degree phase difference from the clock $CLK\phi_0$, and a clock $CLK\phi_{270}$ that has the same frequency as the clock $CLK\phi_0$ and a 270 degree phase difference from the clock $CLK\phi_0$. An example of the clock generator 140 will be discussed in greater detail below with respect to FIG. 6.

In the example optical receiver 100 of FIG. 1, the data slicers 120-1, 120-2, and 120-3 may each generate their N digital signals based on the clock signals $CLK\phi_0$ and $CLK\phi_{180}$, while the edge slicer 120-4 may generate its N digital signals based on clock signals $CLK\phi_{90}$ and $CLK\phi_{270}$. A control signal $CTRL_{CDR}$ that is generated by the decoder and CDR logic 130 as part of a CDR process is input to the clock generator 140 to control the clock generator 140. For example, the control signal $CTRL_{CDR}$ may control phases of the clocks $CLK\phi_0$, $CLK\phi_{90}$, $CLK\phi_{180}$, $CLK\phi_{270}$ such that the data slicers 120-1, 120-2, and 120-3 sample $V_{sig}$ at timings corresponding to symbols in the signal represented by $V_{sig}$ (hereinafter "symbol timings").

In the example optical receiver 100 of FIG. 1, the offset voltages may be set such that $\Delta V_1 > \Delta V_2 > \Delta V_3$. Thus, in the example optical receiver 100, $\Delta V_1$ may be considered a high offset, $\Delta V_2$ may be considered a middle offset, and $\Delta V_3$ may be considered a low offset. The indices h, m, and l are used herein to indicate a correspondence to the high offset (e.g., $\Delta V_1$), the middle offset (e.g., $\Delta V_2$), and the low offset (e.g., $\Delta V_3$), respectively. Thus, in the example of FIG. 1, the N digital signals output by the data slicer 120-1 are labeled $D_{h,0}$–$D_{h,N-1}$, since the data slicer 120-1 uses the high offset $\Delta V_1$. Similarly, the digital signals output by the data slicer 120-2 are labeled $D_{m,0}$–$D_{m,N-1}$ since they are based on the middle offset $\Delta V_2$, and the digital signals output by the data slicer 120-3 are labeled $D_{l,0}$–$D_{l,N-1}$ since they are based on the low offset $\Delta V_3$. Furthermore, the shifted voltage signal in the data slicer 120-1 is designated $V^*_h$, the shifted voltage signal in the data slicer 120-2 is designated $V^*_m$, the shifted voltage signal in the data slicer 120-3 is designated $V^*_l$, and the shifted voltage signal in the edge slicer 120-4 is designated $V^*_m$.

In the example optical receiver 100 of FIG. 1, the offset voltages may be set such that $\Delta V_4 = \Delta V_2$. Thus, in FIG. 1 the digital signals output by the edge slicer 120-4 are labeled $E_{m,0}$–$E_{m,N-1}$, since they are based on the middle offset $\Delta V_4 = \Delta V_2$. However, in other examples the offset voltage $\Delta V_4$ of the edge slicer 120-4 may be set to equal a voltage other than $\Delta V_2$, such as one of the offset voltages $\Delta V_1$ or $\Delta V_3$ or some other voltage.

In certain examples, each of the offset voltages $\Delta V_i$ may be based on a common mode voltage $V_{cm}$ of the voltage signal $V_{sig}$. For example, the optical receiver front-end 110 may determine the common mode voltage $V_{cm}$ of the voltage signal $V_{sig}$, and may output $V_{cm}$ to a subsequent stage for generation of the offset voltages $\Delta V_i$ based on $V_{cm}$. For example, the offset voltage $\Delta V_1$ may equal $V_{cm} + V_A$, the offset voltage $\Delta V_2$ may equal $V_{cm}$, and the offset voltage $\Delta V_3$ may equal $V_{cm} - V_B$, where $V_A$ and $V_B$ are specific voltages. Values of $V_A$ and $V_B$ may be set, for example, such that: (a) the data slicer 120-1 outputs a logic-high value when the voltage signal $V_{sig}$ encodes a high PAM-4 symbol and a logic-low otherwise, and (b) the data slicer 120-3 outputs a logic-low when the voltage signal $V_{sig}$ encodes a low PAM-4 symbol and a logic-high otherwise. Values for $V_A$ and $V_B$ may be determined, for example, by experiment. For example, an iterative process may be used to converge on a value of $V_A$ that minimizes a bit error rate (BER) of the optical receiver. For example, a signal encoding a training pattern may be repeatedly input to the optical receiver 100 while varying the value set for $V_A$ (for example, using a digital-to-analog converter) and measuring the BER each iteration, whereby a value for $V_A$ that minimizes the BER may be found. In some examples, $V_B$ may be automatically set so as to be equal to $V_A$. In other examples, an optimal value for $V_B$ may be determined by the same process described above with respect to $V_A$. The combining of the offset voltage $V_{cm}$ with the voltages $V_A$ or $V_B$ to obtain the offset voltages $\Delta V_i$ may be performed, for example, by a voltage summing circuit (not illustrated), which may be included within the slicers 120 or external to the slicers 120.

As described above, the slicers 120 may determine whether their respective shifted voltage signals V* are greater than a threshold voltage $V_{TH}$. This determination may be made by performing a comparison between the respective shifted voltage signals V* and some other voltage value, which could be a time-varying signal value or a fixed value. In certain examples, the slicers 120 may each compare their corresponding shifted voltage signal V* to its complementary signal $\overline{V^*}$, which may indicate whether the shifted voltage signal V* is greater than a threshold voltage $V_{TH}$. In this case, the threshold voltage $V_{TH}$ may be equal to a common DC level of the shifted voltage signals V* and its complementary signal $\overline{V^*}$, or in other words $V_{TH}$ may equal the value of V* for which $V^* - \overline{V^*} = 0$. In other examples, the shifted voltage signal V* may be compared directly to a fixed voltage value (i.e., the threshold voltage $V_{TH}$) to determine whether the shifted voltage signal V* is greater than the threshold voltage $V_{TH}$. In this case, the fixed voltage value may be set so as to approximate a DC level of the shifted voltage signal V*.

In certain examples, the slicers 120 may each generate their N digital signals by demuxing a number of comparison signals that are generated by determining whether the shifted voltages signal V* is greater than the threshold voltage $V_{TH}$. For example, each of the slicers 120 may include a number of demux stages that demux the comparison signals into the N digital signals.

Thus, the example optical receiver 100 may receive a PAM-4 encoded optical signal and convert the optical signal to an electronic signal, detect the PAM-4 symbols in the signal, and decode the PAM-4 symbols into binary data.

The optical front end 110 may achieve high gain and low noise by using the TIA 111, which allows for higher sensitivity than might otherwise be achievable.

The use of the level shifting amplifier 121 in the slicers 120 may allow for even further increased gain of the signal. The use of the level shifting amplifier 121 may also reduce the capacitive load on the TIA 111, which may help increase a bandwidth of the TIA 111. The use of the level shifting amplifier 121 may also allow the slicer 120 to have a larger offset range than might otherwise be achievable.

The slicers 120 are able to split the incoming symbols of the received signal into N data streams, thereby allowing for parallel processing of the received symbols in the decoder and CDR logic 130. This may provide additional time for the decoder and CDR logic 130 to process each received symbol, which may be helpful when the symbol rate of the received optical symbol is sufficiently high that serial processing of the received symbols becomes difficult or impossible.

For example, if the symbol rate of the received signal is 32 GBd, components of the decoder and CDR logic 130 might need to be expensive, be complex, and/or take up a large amount of space in order to serially process the received symbols at this high symbol rate. However, in this example, the N data streams output by each of the slicers 120 would each have a symbol rate of 32/N GBd, and the decoder and CDR logic 130 may be able to process these streams in parallel with components that are comparatively less expensive, are comparatively less complex, and/or take up comparatively less space. For example, if N=32, then the symbol rate of each data stream output by the slicers 120 would be 1 GBd, which may be more manageable for the decoder and CDR logic 130.

In particular, certain examples of the optical receiver 100 are capable of providing a communication rate of at least 64 Gb/s at 16 nm FinFET process, while maintaining a bit error rate (BER) of $10^{-12}$.

Figure 2:
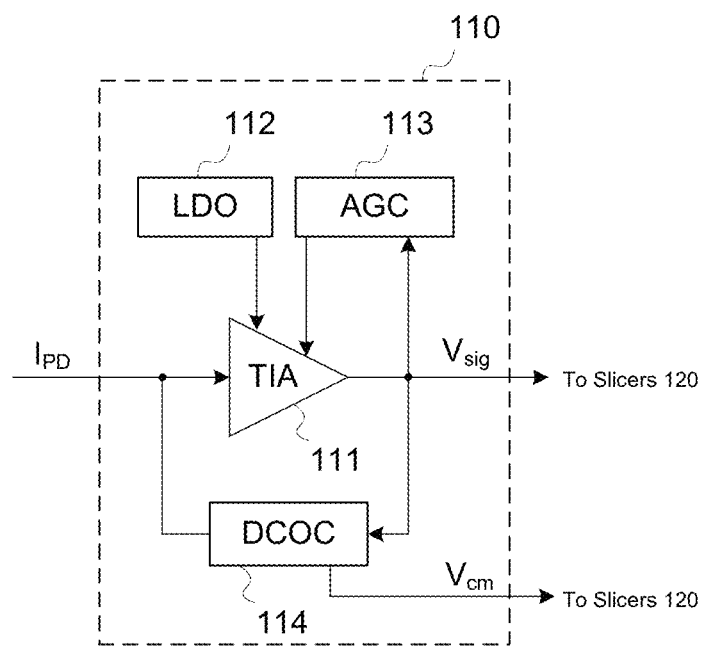
FIG. 2 is a conceptual diagram illustrating an example optical receiver front end.

FIG. 2 illustrates an example optical receiver front-end 110. As described above, the optical receiver front-end 110 includes a TIA 111. The optical receiver front-end 110 may also include a low-dropout regulator (LDO) 112, automatic gain control (AGC) circuitry 113, and DC offset voltage control (DCOC) circuitry 114.

The TIA 111 may be formed, for example, from three inverter stages (not illustrated) with resistive feedback (not illustrated) in the first and third stages. The resistive feedback of the third stage may be, for example, able to change its resistance based on a control signal from the AGC 113; for example, the feedback resistance may include a transistor connected in parallel to a resistor.

The LDO 112 provides a constant voltage power supply to the TIA 111.

The AGC circuitry 113 automatically controls a gain of the TIA 111. For example, the AGC circuitry 113 may automatically reduce a gain of the TIA when the photodiode output signal $I_{PD}$ is large (which may happen when the power of the received optical signal is high), thus keeping the voltage signal $V_{sig}$ within a particular range that may facilitate normal operation of the slicers 120. For example, the AGC circuitry 113 may monitor the signal $V_{sig}$, and may control the gain of the TIA 111 based on $V_{sig}$. The AGC circuitry 113 may control the gain of the TIA 111 by generating a signal that controls a feedback resistance within the TIA 111. For example, the AGC circuitry 113 may determine whether $V_{sig}$ exceeds $V_{cm}$ (which may be obtained from the DCOC circuitry 114) by more than a certain amount, and if so the ADC circuitry 113 may send a control signal to the TIA 111 that reduces a feedback resistance in the TIA 111, thus reducing the gain of the TIA 111. For example, when the resistive feedback of the third stage includes a transistor connected in parallel to a resistor, the control signal may decrease the resistance of the resistive feedback by turning on the transistor.

The DCOC circuitry 114 may cancel a DC voltage offset of the TIA 111 that is due to a DC component of the photodiode output signal $I_{PD}$. In addition, the DCOC circuitry 114 may obtain the common mode voltage $V_{cm}$ of the voltage signal $V_{sig}$, which may be output to the slicers 120 for use in generating the offset voltages $\Delta V_i$. For example, the DCOC circuitry 114 may include a low-pass filter that receives the output of the TIA 111 and outputs $V_{cm}$. The DCOC circuitry 114 may then, based on $V_{cm}$, subtract from an input node of the TIA 111 a portion of current that corresponds to the aforementioned DC component of $I_{PD}$.

Figure 3A:
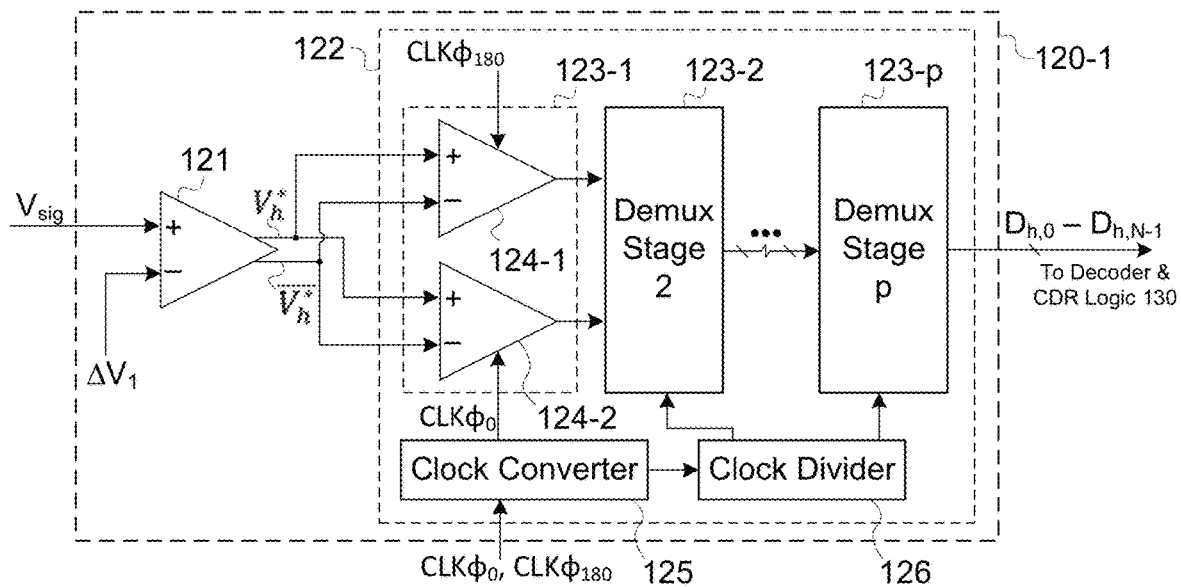
FIGS. 3A-3C are conceptual diagrams illustrating example data slicers.
Figure 3B:
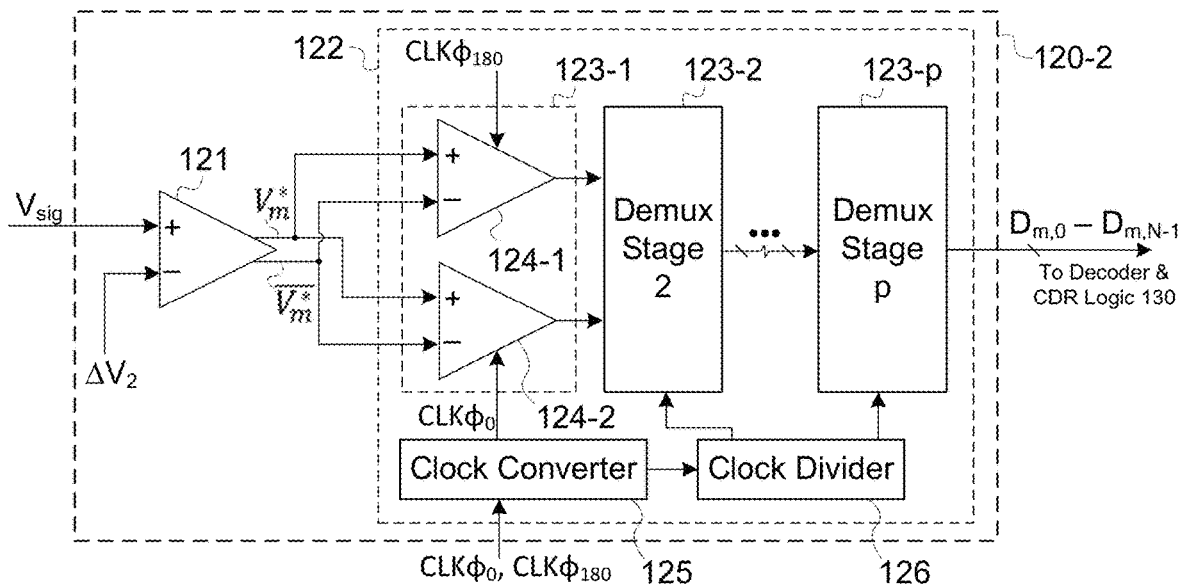
Figure 3C:
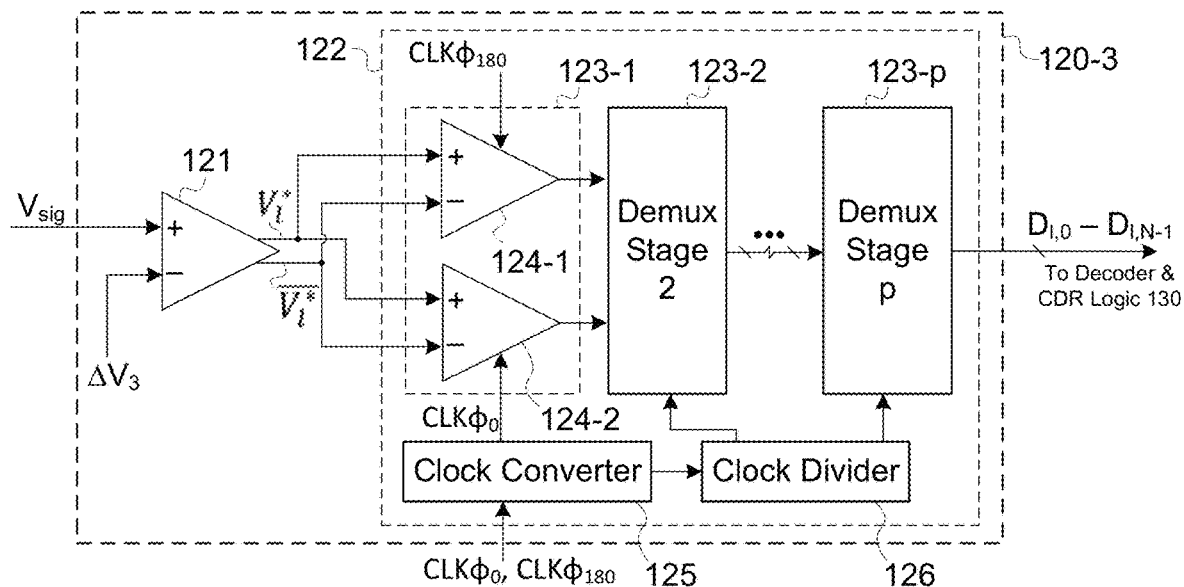
Figure 3D:
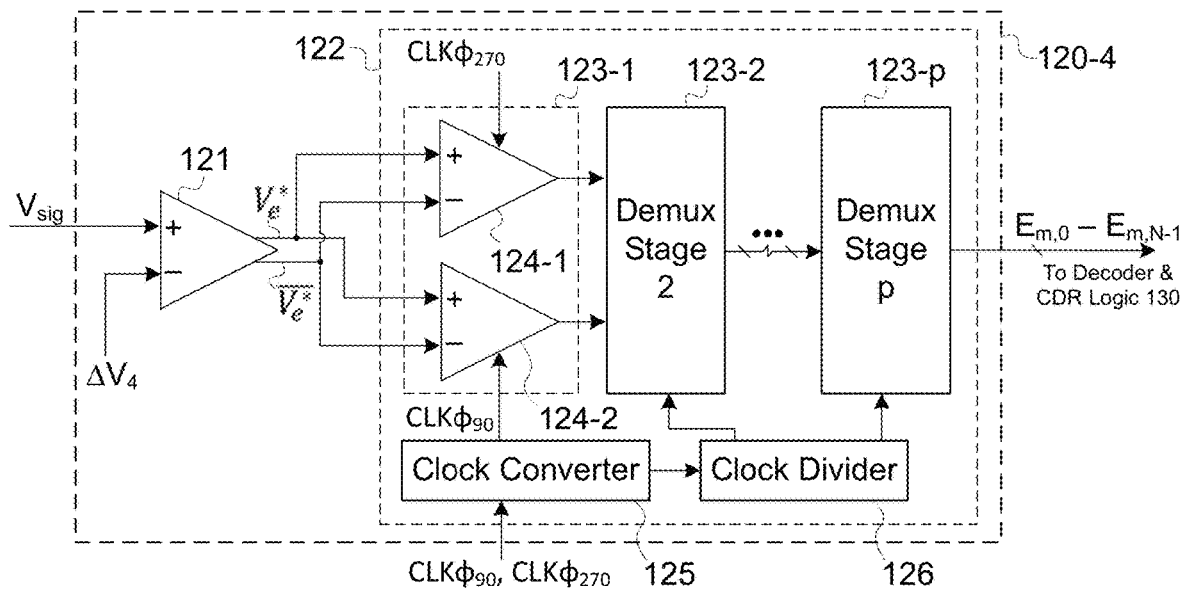
FIG. 3D is a conceptual diagram illustrating an example edge slicer.

FIGS. 3A-3D illustrate example slicers 120. FIGS. 3A-3C illustrate example data slicers 120-1, 120-2, and 120-3, while FIG. 3D illustrates an example edge slicer 120-4.

The example data slicer 120-1 illustrated in FIG. 3A includes a voltage shifting amplifier 121, and a comparison section 122.

The voltage shifting amplifier 121 shifts the voltage signal $V_{sig}$ based on the offset voltage $\Delta V_1$, and outputs a shifted voltage signal $V^*_h$. In the example data slicer 120-1, the voltage shifting amplifier 121 may also output the signal $\overline{V^*_h}$, which is the complementary signal of the shifted voltage signal $V^*_h$. The voltage shifting amplifier 121 may be, for example, a CML-buffer.

The comparison section 122 determines whether the shifted voltage signal $V^*_h$ is greater than a threshold voltage $V_{TH}$, generates comparison signals based on the determination, and generates N digital signals $D_{h,0}$–$D_{h,N-1}$ by demuxing the comparison signals. The determinations may be performed at timings controlled by input clock signals(s) so as to coincide with symbol timings in the received signal. The comparison signal for a given symbol timing $S_i$ indicates whether the shifted voltage signal $V^*_h$ is greater than the threshold $V_{TH}$ at the given symbol timing $S_i$. This information, when combined with similar information from the other slicers 120, may be used by the decoder and CDR logic 130 to determine which PAM-4 symbol is represented in the voltage signal $V_{sig}$ at the given symbol timing $S_i$.

For example, the comparison section 122 may include a number of comparators 124 that each compare the shifted voltage signal $V^*_h$ with another voltage to determine whether the shifted voltage signal $V^*_h$ is greater than the threshold voltage $V_{TH}$. In the example illustrated in FIG. 3A, the comparators 124 perform the aforementioned determination by comparing the shifted voltage signal $V^*_h$ with its complementary signal $\overline{V^*_h}$. In this example, an output of one of the comparators 124 is a logical high value whenever the shifted voltage signal $V^*_h$ is greater than its complementary signal $\overline{V^*_h}$, and a logical low value whenever the shifted voltage signal $V^*_h$ is less than its complementary signal $\overline{V^*_h}$. As described above, this comparison indicates whether the voltage signal $V^*_h$ is greater than a threshold voltage $V_{TH}$ that may be equal to a common DC level of the signals $V^*_h$ and $\overline{V^*_h}$. Thus, the outputs of the comparators 124 are examples of the comparison signals described above. The output of a given comparator 124 for a given symbol timing $S_i$ indicates whether the shifted voltage signal $V^*_h$ is greater than the threshold $V_{TH}$ at the symbol timing $S_i$. The comparators 124 may correct for a DC offset thereof based on DC offset cancelation signal input thereto, which may be generated by DC offset cancellation circuitry (not illustrated).

The comparators 124 may be clocked comparators that perform the comparisons at specific timings based on an input clock signal. In particular, the comparators 124 within the data slicer 120-1 may be controlled by different clock signals that are configured such that the comparators 124 compare the shifted voltage signal $V^*_h$ and the signal $\overline{V^*_h}$ at different timings. In addition, the clock signals may be such that the comparators 124 within the data slicer 120-1 compare the shifted voltage signal $V^*_h$ and the signal $\overline{V^*_h}$ at symbol timings, such that at each symbol timing one of the comparators is performing the comparison and the comparators 124 cyclically alternate which comparator 124 is performing the comparison.

For example, in FIG. 3A the clock CLK$\phi_0$ controls the comparator 124-2 and the clock CLK$\phi_{180}$ controls the comparator 124-1. The clocks CLK$\phi_0$ and CLK$\phi_{180}$ each have a frequency that is half of the symbol rate of the signal received by the optical receiver 100, and their phases are set such that the comparators 124-1 and 124-2 will alternately compare the signals $V^*_h$ and $\overline{V^*_h}$ at every-other symbol timing. For example, see the clock signals illustrated in FIG. 6B. Thus, for example, the comparator 124-2 may perform the comparison at symbol timings $S_0$, $S_2$, $S_4$, . . . , while the comparator 124-1 may perform the comparison at symbol timings $S_1$, $S_3$, $S_5$, . . . . The data slicer 120-1 may include a clock converter 125 that receives the clock signals from the clock generating section 140 in one format and converts the clock signals into another format for use by the comparators 124. For example, the clock signals output by the clock generating section may be in common-mode logic (CML) format, and the clock converter 125 may convert the clock signals into complementary metal-oxide-semiconductor (CMOS) format.

The comparison section 122 may also include a number of demux stages 123. Because the comparators 124-1 and 124-2 generate two comparison signals from one shifted voltage signal $V^*_h$ (one comparison signal for odd symbol timings and one comparison signal for even symbol timings), the comparators 124-1 and 124-2 can be said to perform a demuxing function in addition to their comparison function. Thus, the comparators 124-1 and 124-2 may be considered as a first demux stage 123-1 out of the number of demux stages 123, wherein the first demux stage 123-1 has a demux ratio of 1:2. Additional demux stages (if any), such as demux stages 123-2 through 123-p in FIG. 3A, may be formed from any type of demuxers, such as D-Flip-Flop demuxers.

Any number of demux stages 123 may be included in the comparison section 122, in order to obtain the N digital signals $D_{h,0}$–$D_{h,N-1}$. Using demuxers with lower demux ratios may result in using more demux stages 123 to obtain the N digital signals $D_{h,0}$–$D_{h,N-1}$, while using demuxers with higher demux ratios may result in using fewer demux stages 123. However, demuxers with higher demux ratios may be more expensive or complicated than demuxers with lower demux ratios, or may not be able to operate at a desired speed. In certain examples, earlier demux stages 123 may have lower demux ratios than subsequent demux stages 123, since the earliest demux stages 123 may need to operate at the highest speeds.

For example, if N=32, then one possible arrangement of the demux section 122 may include a first demux stage 123-1 with a 1:2 demux ratio (which may be formed by the comparators 124-1 and 124-2), a second demux stage 123-2 with two 1:4 demuxers (one for each of outputs of the first demux stage), and a third demux stage 123-3 with eight 1:4 demuxers (one for each of outputs of the second demux stage).

When more than one demux stages 123 are provided, a clock divider 126 may be included in the slicer 120 to generate clock signals for the demux stages 123-2 through 123-p based on the clock signals output by the clock converter 125. The clock divider 126 may generate clocks for a given demux stage 123-i based on the clocks of a previous demux stage 123-(i−1).

FIG. 3B illustrates an example of the data slicer 120-2. The data slicer 120-2 includes similar components as those of the data slicer 120-1 described above, and duplicative description thereof is omitted.

The data slicer 120-2 differs from the data slicer 120-1 in that the offset voltage that is set for the data slicer 120-2 is $\Delta V_2$ (rather than $\Delta V_1$). As a result, the shifted voltage signal in the data slicer 120-2 is $V^*_m$ (rather than $V^*_h$). Thus, the N digital signals output by the data slicer 120-2 are labeled $D_{m,0}$–$D_{m,N-1}$.

FIG. 3C illustrates an example of the data slicer 120-3. The data slicer 120-3 includes similar components as those of the data slicer 120-1 described above, and duplicative description thereof is omitted.

The data slicer 120-3 differs from the data slicer 120-1 in that the offset voltage that is set for the data slicer 120-3 is $\Delta V_3$ (rather than $\Delta V_1$). As a result, the shifted voltage signal in the data slicer 120-3 is $V^*_l$ (rather than $V^*_h$). Thus, the N digital signals output by the data slicer 120-3 are labeled $D_{l,0}$–$D_{l,N-1}$.

FIG. 3D illustrates an example of the edge slicer 120-4. The edge slicer 120-4 includes similar components as those of the data slicer 120-1 described above, and duplicative description thereof is omitted.

The edge slicer 120-4 differs from the data slicers 120-1, 120-2, and 120-3 in that the offset voltage that is set for the edge slicer 120-4 is $\Delta V_4$. As a result, the shifted voltage signal in the edge slicer 120-4 is $V^*_e$. The value of the offset voltage $\Delta V_4$ may be flexibly selected so as to equal, for example, one of the offset voltages $\Delta V_1$, $\Delta V_2$, and $\Delta V_3$. In examples in which $\Delta V_4 = \Delta V_2$, then $V^*_e = V^*_m$, and in this case the transition edges in a middle eye region of the received optical signal may be used as edge information for the decoder and CDR logic 130. In examples in which $\Delta V_4 = \Delta V_1$, then $V^*_e = V^*_h$, and in this case the transition edges in a high eye region of the received optical signal may be used as edge information for the decoder and CDR logic 130. In examples in which $\Delta V_4 = \Delta V_3$, then $V^*_e = V^*_l$, and the transition edges in a low eye region of the received optical signal may be used as edge information for the decoder and CDR logic 130. In certain examples the value of the offset voltage $\Delta V_4$ may be changed occasionally during operation so as to alternate between the various eye regions for sampling transition edges.

The edge slicer 120-4 further differs from the data slicer 120-1 in that the comparators 124 of the edge slicer 120-4 are controlled by clock signals that are phase shifted relative to the clock signals that control the data slicers 120-1 through 120-3. The phase shifts are such that the edge slicer 120-4 performs comparisons at timings in-between the symbol timings. Thus, the N digital signals output by the edge slicer 120-4 may be referred to as edge signals, and hence are labeled in FIG. 3D as $E_{m,0}$–$E_{m,N-1}$. FIG. 6B illustrates examples of such clock signals.

For example, when the clocks $CLK\phi_0$, and $CLK\phi_{180}$ are used to control the comparators 124 of the data slicers, then the clocks $CLK\phi_{90}$, and $CLK\phi_{270}$ may be used to control the comparators 124 of the edge slicer 120-4, as illustrated in FIG. 3D. As can be seen in FIG. 6B, these clock signals may result in the comparators 124 performing their comparisons at transition timings in-between symbol timings.

In certain examples, all of the slicers 120 may have the same internal structure as one another, with differences between the slicers 120 being found in the offset voltages $\Delta V_i$ that are set for the respective slicers 120 and in the clock signals that are used in the slicers 120.

Although one edge slicer is illustrated in FIG. 1 (namely, edge slicer 120-4), multiple edge slicers could be included in the optical receiver 100. In such a case, the edge slicers may have different offset voltages from one another. For example, one edge slicer may be set to the middle offset, one edge slicer may be set to the high offset, and one edge slicer may be set to the low offset.

Although FIGS. 3A-3D illustrate two comparators 124 per slicer 120, any number of comparators 124 could be included in each of the slicers 120. In general, if there are X comparators 124 included in each slicer 120, where $X \geq 1$, then there may be X clock(s) for controlling the X comparators 124 of any given slicer 120. In such a case, each of the X clocks for a given slicer 120 may have a frequency that is 1/X times the symbol rate of the received signal. When there are multiple comparators 124 in each slicer 120 (e.g., when X>1), then the X clocks for any given slicer 120 may be phase-shifted from one another by increments of 360/X degrees. The data slicers (e.g., data slicers 120-1 through 120-3) may all use the same clocks as one another, while the edge slicer(s) (e.g., edge slicer 120-4) may use clocks that are phase shifted 180/X degrees from the clocks used for the data slicers. Thus, the clock generator 140 may generate a 2X-phase clock (i.e., 2X clock signals with the same frequency and different phases) for the bank of slicers 120 (i.e., X clocks for the data slicers and X clocks for the edge slicers). This means that, in certain examples, a maximum number of comparators 124 per slicer 120 may be related to the ability of the clock generator 140 to generate a sufficient number of clocks within acceptable operation parameters.

For example, if there are four comparators 124 in each of the slicers 120 (i.e., X=4), then the data slicers 120-1 through 120-3 may be controlled using clocks having phases $\phi_0$, $\phi_{90}$, $\phi_{180}$, and $\phi_{270}$, while the edge slicer 120-4 may be controlled using clocks having phases $\phi_{45}$, $\phi_{135}$, $\phi_{225}$, and $\phi_{315}$, with all of the aforementioned clocks having a frequency that is ¼ the symbol rate.

When multiple comparators 124 are included in each of the slicers 120 (i.e., when X>1), then the comparators 124 may be considered as a first demux stage 123-1, with a demux ratio of 1:X.

When exactly one comparator 124 is included in each of the slicers 120 (i.e., when X=1), then the comparator 124 would not necessarily be part of any of the demux stages 123. In such an example, a first demux stage 123-1 may be provided downstream of the comparator 124. In such an example, a single clock signal may control the comparator 124 which may have a frequency equal to the symbol rate, and the clock signal for the edge slicer may be phase shifted 180 degrees from the clock signal for the data slicers.

Although the comparators 124 shown in FIGS. 3A-3D determine whether the shifted voltage signal $V^*_h$ is greater than the threshold voltage $V_{TH}$ by comparing the shifted voltage signal $V^*_h$ with its complementary signal $\overline{V^*_h}$, the determination could be made in other ways. For example, the comparators 124 could compare the shifted voltage signal $V^*_h$ directly to a voltage value that corresponds to the threshold voltage $V_{TH}$.

Figures 4A, 4B, 4C:
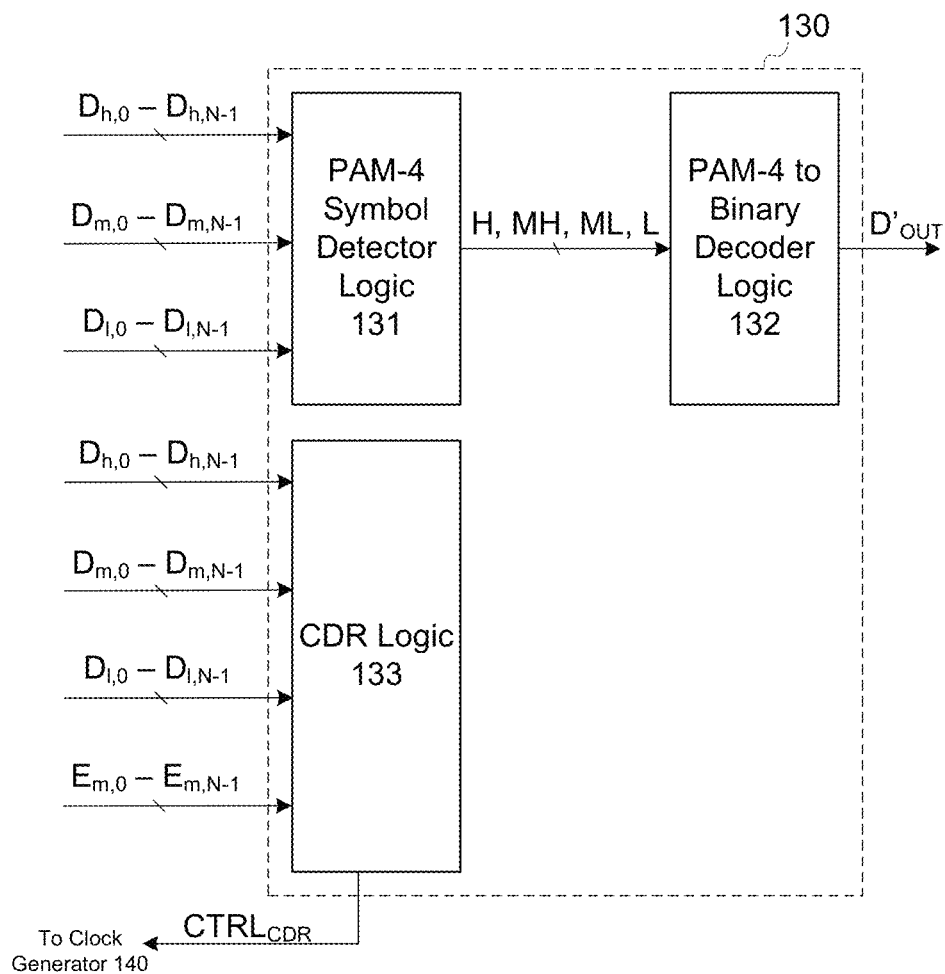
FIG. 4A is a conceptual diagram illustrating example decoder and CDR logic.
FIG. 4B is an example logic table.
FIG. 4C is an example symbol-to-bit sequence correspondence table.

FIG. 4A illustrates an example of the decoder and CDR logic 130. The example decoder and CDR logic 130 may include PAM-4 symbol detector logic 131, PAM-4 to binary decoder logic 132, and CDR logic 133.

The PAM-4 symbol detector logic 131 may receive 3N digital signals from the data slicers 120-1 through 120-3, and based on these signals may detect PAM-4 symbols of the received optical signal according to the logic table shown in FIG. 4B. The four levels of the PAM-4 encoding are labeled herein for convenience "H" (i.e., high), "MH" (i.e., middle-high), "ML" (i.e., middle-low), and "L" (i.e., low), in descending order of magnitude. FIG. 7 illustrates graphically the PAM-4 symbol levels.

Figure 5:
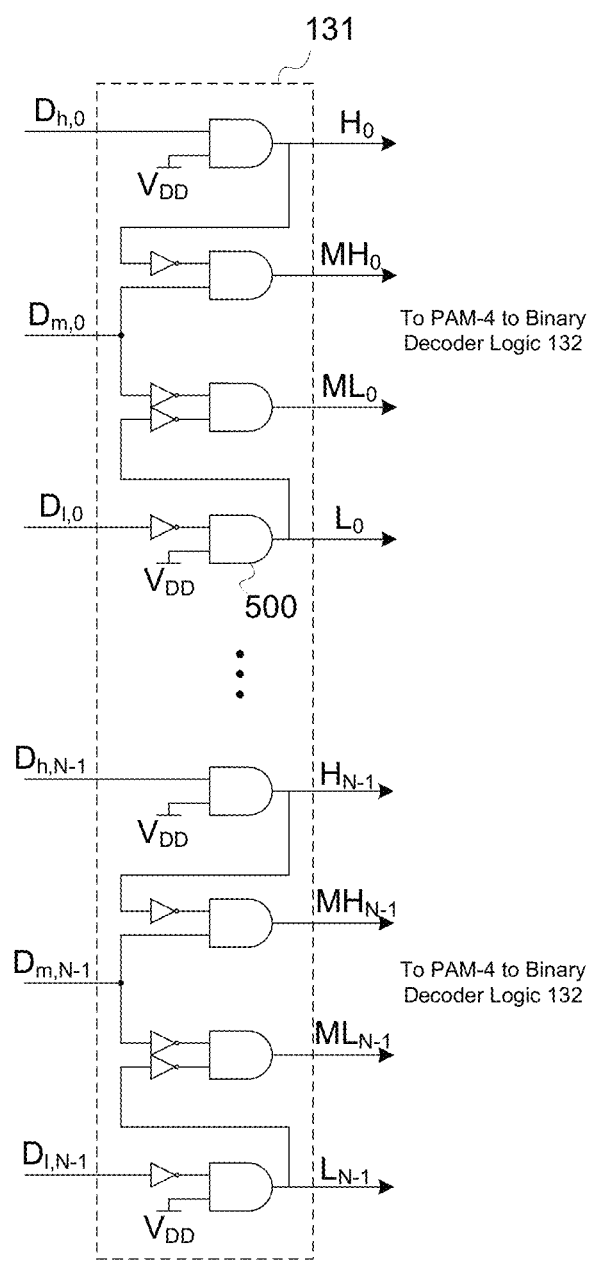
FIG. 5 is a conceptual diagram illustrating example symbol detection logic.

The PAM-4 symbol detector logic 131 may be any logic that implements the logic table shown in FIG. 4B. In particular, for a given symbol timing $S_i$, the detected symbol may be determined based on the digital signals $D_{h,i}$, $D_{m,i}$, $D_{l,i}$. If the digital signal $D_{h,i}$ is logical 1, then the PAM-4 symbol that is detected is an H symbol (regardless of the values of the digital signals $D_{m,i}$ and $D_{l,i}$). If the digital signal $D_{h,i}$ is logical 0 and the digital signal $D_{m,i}$ is logical 1, then the PAM-4 symbol that is detected is an MH symbol (regardless of the value of the digital signal $D_{l,i}$). If the digital signal $D_{l,i}$ is logical 1 and the digital signal $D_{m,i}$ is logical 0, then the PAM-4 symbol that is detected is an ML symbol (regardless of the value of the digital signal $D_{h,i}$). If the digital signal $D_{l,i}$ is logical 0, then the PAM-4 symbol that is detected is an L symbol (regardless of the values of the digital signals $D_{h,i}$ and $D_{m,i}$). A signal indicating which PAM-4 symbol has been detected for the given symbol timing $S_i$ may be sent to the PAM-4 to binary decoder logic 132. An example of PAM-4 symbol detector logic 131 is shown in FIG. 5.

The PAM-4 to binary decoder logic 132 may be any logic that converts the detected PAM-4 symbols into the appropriate binary bit sequences. The correspondence between bit sequences and PAM-4 symbol may be arbitrarily determined by a communication protocol being used. For example, FIG. 4C illustrates one possible set of correspondences between PAM-4 symbols and binary bit sequences. The PAM-4 to binary decoder logic 132 may output a data stream $D'_{OUT}$ composed of the binary bits sequences obtained from decoding the detected PAM-4 symbols. Thus, for example, if a first symbol $S_0$ is an H, a second symbol $S_1$ is an L, and a third symbol $S_2$ is an MH, then the corresponding data stream $D'_{OUT}$ may be 110010, output in the order of left to right.

The bit-rate of the data stream $D'_{OUT}$ may be twice the symbol rate of the optical signal, as each PAM-4 symbol encodes two bits. The data stream $D'_{OUT}$ may be in any binary format, such as a non-return to zero (NRZ) format. The data stream $D'_{OUT}$ may be subjected to subsequent stages of processing, such as gray decoding and forward error correction (FEC) processing.

The CDR logic 133 may be any logic that performs CDR processing based on the digital signals output by the slicers 120. For example, the CDR logic 133 may include edge detection logic that detects edges of symbol timings in the received signal based at least on the edge signals $E_{m,0}$–$E_{m,N-1}$. The CDR logic 133 may output a control signal $CTRL_{CDR}$, which may control the clock generator 140 to adjust the phases of the clock signals such that the comparators 124 perform their comparisons during symbol timings. The CDR logic 133 may also use the data signals output by the data slicers 120-1 through 120-3 in the CDR process, in addition to the edge signals output by the edge slicer 120-4.

FIG. 5 illustrates an example of the PAM-4 symbol detector logic 131. The example PAM-4 symbol detector logic 131 includes N sets of four AND logic gates 500, with each set of four logic gates 500 corresponding to a different symbol timing $S_i$. For example, a first set of AND logic gates 500, which corresponds to the $0^{th}$ symbol timing $S_0$, receives the signals $D_{h,0}$, $D_{m,0}$, and $D_{l,0}$, and detects a PAM-4 signal for the $0^{th}$ symbol timing $S_0$ based on these signals. The PAM-4 symbol detector logic 131 may indicate the identity of the detected PAM-4 symbol for a given symbol timing $S_i$ by driving a wiring corresponding to the detected signal to a logical high value (e.g., the $H_0$ wiring may be pulsed high when the detected symbol for the $0^{th}$ symbol timing $S_0$ is H).

The example PAM-4 symbol detector logic 131 illustrated in FIG. 5 is merely one possible logic that implements the logic table shown in FIG. 4B, and any other logic could be used that implements the logic table shown in FIG. 4B. For example, OR gates, NOR gates, NAND gates, XOR gates, and/or XNOR gates could be used instead of (or in addition to) AND gates.

Figure 6A:
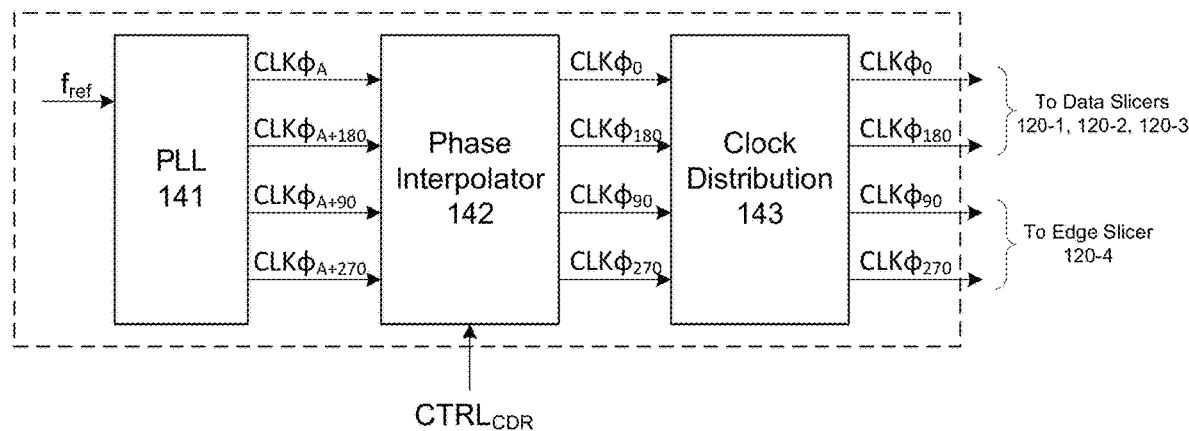
FIG. 6A is a conceptual diagram illustrating an example clock generator.
Figure 6B:
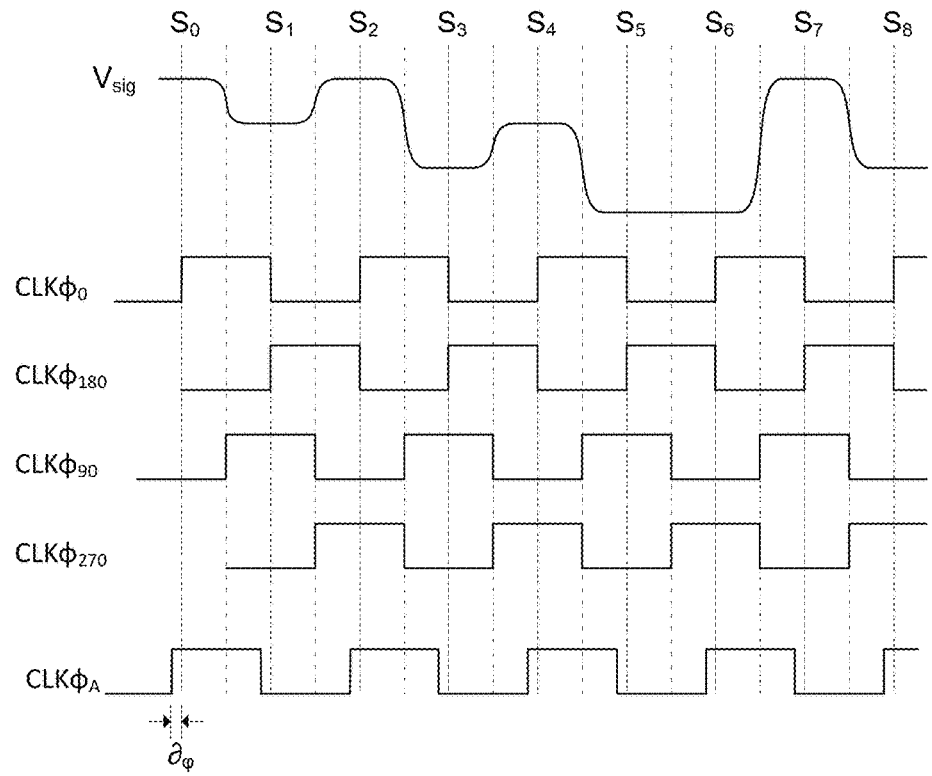
FIG. 6B is a signal diagram illustrating example clock signals.

FIG. 6A illustrates an example of the clock generator 140. The example clock generator 140 may include a phase-locked-loop (PLL) 140, a phase interpolator 140, and clock distribution circuitry 143.

The PLL 141 may receive a reference frequency $f_{ref}$ and generate a multiple-phase clock based thereon. The multiple-phase clock may consist of M clock signals with the same frequency as one another and different phases, where M is a positive integer. The phases of the M clock signals may be separated by 360/M degrees from one another. For example, in FIG. 6A the multiple-phase clock generated by the PLL 141 includes the signals $CLK\phi_A$, $CLK\phi_{A+90}$, $CLK\phi_{A+180}$, and $CLK\phi_{A+270}$. The frequency of the multiple-phase clock may be k times the reference frequency $f_{ref}$, where k can be an integer or fractional number greater than zero.

The phase interpolator 142 may shift a phase of each of the clock signals that is output by the PLL 141 by a programmable phase shift $\partial_\phi$. The phase shift $\partial_\phi$ may be negative or positive, and may be variably controlled based on the control signal $CTRL_{CDR}$. For example, in FIG. 6A the phase interpolator 142 outputs a multiple-phase clock that includes the clock signals $CLK\phi_0$, $CLK\phi_{90}$, $CLK\phi_{180}$, and $CLK\phi_{270}$, where: the phase of $CLK\phi_0$ is equal to the phase of $CLK\phi_A$ shifted by $\partial_\phi$ (i.e., $\phi_0 = \phi_A + \partial_\phi$), the phase of $CLK\phi_{90}$ is equal to the phase of $CLK\phi_{A+90}$ shifted by $\partial_\phi$ (i.e., $\phi_{90} = \phi_A + 90 + \partial_\phi$), and so on.

For example, consider the signals illustrated in FIG. 6B. An example voltage signal $V_{sig}$ is illustrated, with symbol timings indicated by the notation $S_i$. A symbol timing $S_i$ may correspond to, for example, a period of time in which the received signal stabilizes at a symbol level. The symbol timings are separated from one another by transition periods in which the received signal may change from one symbol level to another symbol level. In the example of FIG. 6B, the signals $CLK\phi_0$ and $CLK\phi_{180}$ each correspond to every-other symbol timing $S_i$, thus causing the comparators 124 in the data slicers 120-1 through 120-3 to perform their comparisons at the symbol timings $S_i$ (with the comparators 124-1 and 124-2 alternating back and forth every-other symbol timing $S_i$). In the example of FIG. 6B, the signals $CLK\phi_{90}$ and $CLK\phi_{270}$ each correspond to every-other transition period, and thus cause the comparators 124 in the edge slicer 120-4 to perform their comparisons during the transition periods (with the comparators 124-1 and 124-2 alternating back and forth every-other transition period).

The clock distribution circuitry 143 may distribute the clock signals to the slicers 120. For example, the clock distribution circuitry 143 may include buffers, wiring lines, delay elements, and the like that are configured to ensure that corresponding clock signals that arrive at different devices are properly synchronized. For example, the clock distribution circuitry 143 may be configured to ensure that the signal $CLK\phi_0$ that is received at the slicer 120-1 is properly synchronized with the signal $CLK\phi_0$ that is received at the slicer 120-3.

FIG. 7 illustrates example eye diagrams for the example optical receiver 100. The eye diagrams are simulated based on a 400 uA input current or equivalent 570 uW optical input power, an optical signal having a symbol rate of 32 GBd, and the optical receiver 100 being formed using 16 nm FinFET process.

A top left eye diagram illustrates an output of a Mach-Zehnder modulator (MZM) of an optical transmitter transmitting an optical signal to the optical receiver 100. The PAM-4 symbol levels H, MH, ML, and L are illustrated.

The top right eye diagram illustrates the voltage signal $V_{sig}$ that is output by the TIA 111 based on the optical signal.

The bottom left eye diagram illustrates the difference between the shifted voltage $V^*_h$ of the data slicer 120-1 and its complementary signal $\overline{V^*_h}$. As can be seen in the diagram, the signal has been shifted by the voltage shifting amplifier 121 based on the high offset $\Delta V_1$ so that a value of 0V (shown by the dashed line) is approximately centered within the top eye of the eye diagram. Thus, if the symbol of the signal at the time that the comparators 124 perform their comparison is an H symbol, then $V^*_h - \overline{V^*_h} > 0$ and the comparators 124 of the data slicer 120-1 will output logical 1, and if the symbol is anything other than H then $V^*_h - \overline{V^*_h} < 0$ and the comparators 124 of the data slicer 120-1 will output logical 0.

The bottom center eye diagram illustrates the difference between the shifted voltage $V^*_m$ of the data slicer 120-2 and its complementary signal $\overline{V^*_m}$. As can be seen in the diagram, the signal has been shifted by the voltage shifting amplifier 121 based on the middle offset $\Delta V_2$ so that a value 0V (shown by the dashed line) is approximately centered within the middle eye of the eye diagram. Thus, if the symbol of the signal at the time that the comparators 124 perform their comparison is an H symbol or an MH symbol, then $V^*_m - \overline{V^*_m} > 0$ and the comparators 124 of the data slicer 120-2 will output logical 1, and if the symbol is an ML symbol or an L symbol then $V^*_m - \overline{V^*_m} < 0$ and the comparators 124 of the data slicer 120-2 will output logical 0.

The bottom right eye diagram illustrates the difference between the shifted voltage $V^*_l$ of the data slicer 120-3 and its complementary signal $\overline{V^*_l}$. As can be seen in the diagram, the signal has been shifted by the voltage shifting amplifier 121 based on the low offset $\Delta V_3$ so that a value 0V (shown by the dashed line) is approximately centered within the lower eye of the eye diagram. Thus, if the symbol of the signal at the time that the comparators 124 perform their comparison is an L symbol, then $V^*_l - \overline{V^*_l} < 0$ and the comparators 124 of the data slicer 120-3 will output logical 0, and if the symbol is anything other than L then $V^*_l - \overline{V^*_l} > 0$ and the comparators 124 of the data slicer 120-3 will output logical 1.

FIG. 7 illustrates wide open PAM-4 eye-diagrams at a symbol rate of 32 GBd (bit rate of 64 Gb/s). These wide-opened eye-diagrams indicate a healthy optical transceiver link which is able to support a BER of $10^{-12}$ at a bit rate of 64 Gb/s.

Figure 8:
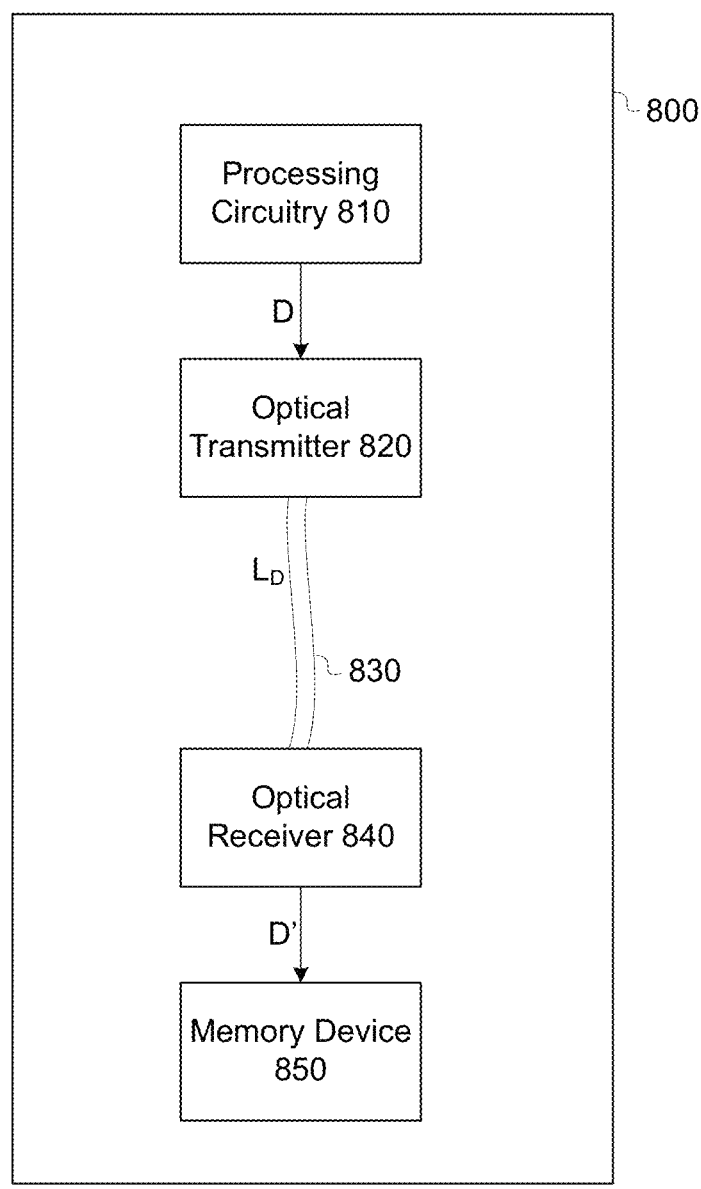
FIG. 8 is a conceptual diagram illustrating an example computing device.

FIG. 8 illustrates an example of a computing device 800. The computing device 800 may include processing circuitry 810, an optical transmitter 820, an optical transmission medium 830, an optical receiver 840, and a memory device 850. The computing device 800 may generate data D that is to be transmitted to the memory device 850. The optical transmitter 820 may generate an optical signal $L_D$ by encoding the data D using PAM-4 encoding, and transmit the optical signal $L_D$ via the optical medium 830. The optical receiver 840 may receive the optical signal $L_D$, decode the signal from PAM-4 into binary data D', and output the data D' to the memory device. If there are no bit errors in the communication, then the data D' will be the same as the data D. Additional processes may be performed by the optical transmitter 820 and the optical receiver 840 as part of the various conversions between the data D, the optical signal $L_D$, and the data D', such as gray code processing and forward error correction (FEC) processing.

The processing circuitry 810 may be any circuitry capable of executing machine-readable instructions, such as a central processing unit (CPU), a microprocessor, a microcontroller device, a digital signal processor (DSP), etc. The processing circuitry 810 may also include an application-specific integrated circuit (ASIC), a field-programmable gate array (FPGA), an application-specific instruction set processor (ASIP), or the like.

The optical transmitter 820 may be any transmitter capable of converting binary data into PAM-4 optical signals and transmitting the symbols via an optical transmission medium 830. In certain examples, the optical transmitter 820 may also include optical receiver functionalities, in which case the optical transmitter 820 may be used to receive data from the memory device 850 in addition to sending data to the memory device 850. If the optical transmitter 820 does include receiving functionality, the receiving functionality may be provided by circuitry corresponding to that of the example optical receivers 100 described above.

The optical receiver 840 may include circuitry corresponding to that of the example optical receivers 100 described above. In certain examples, the optical receiver 840 may also include optical transmission functionalities, in which case the optical receiver 840 may be used to transmit data to the processing circuitry 810 in addition to receiving data from the processing circuitry 810.

The memory device 850 may be any non-transitory machine readable medium, which may include volatile storage media (e.g., DRAM, SRAM, etc.) and/or non-volatile storage media (e.g., PROM, EPROM, EEPROM, NVRAM, hard drives, optical disks, etc.).

The optical receiver 100 may be used in any device that is to receive PAM-4 encoded optical signals. For example, the optical receiver 100 may be used in network devices, such as switches, routers, hubs, and the like. As another example, the optical receiver 100 could be used in high-speed rack-to-rack interconnects within a datacenter.

In the description above, the inputs and/or outputs of various components were described as having a logical high voltage or a logical low voltage and/or were described as being a logical 1 or a logical 0. This description is merely for convenience, and it will be understood that opposite logical relations could be used, with corresponding changes to the components to account for the changed logic.

The foregoing describes example optical receivers. While the above disclosure has been shown and described with reference to the foregoing examples, it should be understood that other forms, details, and implementations may be made without departing from the spirit and scope of this disclosure.

What is claimed is:

1. An optical receiver, comprising:
   an optical receiver front-end comprising a transimpedance amplifier to convert a photodiode output signal to a voltage signal;
   four slicers including three data slicers and one edge slicer, where each of the slicers is to:
      shift the voltage signal based on an offset voltage set for the respective slicer,
      determine whether the shifted voltage signal is greater than a threshold value and generate a number of comparison signals based on the determining, and
      generate N digital signals by demuxing the comparison signals, where N>1;
   wherein each of the slicers includes:
      a voltage shifting amplifier to shift the voltage signal based on the offset voltage set for the respective slicer, and
      a number of comparators to determine whether the shifted voltage signal is greater than the threshold,
   the comparators of the edge slicer use clock signals that are phase shifted relative to corresponding clock signals used by the comparators of each of the data slicers;
   wherein each of the slicers includes two of the comparators,
   the two comparators of each of the data slicers are controlled by a first clock and a second clock that is phase shifted 180 degrees from the first clock, and
   the two comparators of the edge slicer are controlled by a third clock and a fourth clock, the third clock being phase shifted 90 degrees from the first clock, and the fourth clock being phase shifted 270 degrees from the first clock; and
   a logic block that is to perform PAM-4 to binary decoding based on the 3N digital signals output by the data slicers and sense edge transitions for a clock-and-data-recovery process based on the N digital signals output by the edge slicer.

2. The optical receiver of claim 1,
   wherein the optical receiver front end includes:
      automatic gain control circuitry that is to automatically control a gain of the transimpedance amplifier when the photodiode output signal is larger than a particular value, and
      DC offset cancelation circuitry that is to cancel a DC voltage offset of the transimpedance amplifier that is due to a DC component of the photodiode output signal.

3. The optical receiver of claim 1,
   wherein the voltage signal corresponds to a PAM-4 encoded signal that transitions between a first voltage level, a second voltage level that is higher than the first voltage level, a third voltage level that is higher than the second voltage level, and a fourth voltage level that is higher than the third voltage level, and
   the respective offset values that are set for the data slicers are such that:
      the shifted voltage signal of a first one of the data slicers is above the threshold whenever the voltage signal is at the fourth voltage level, and below the threshold whenever the voltage signal is at one of the first, second, and third voltage levels,
      the shifted voltage signal of a second one of the data slicers is above the threshold whenever the voltage signal is at one of the third and fourth voltage levels, and below the threshold whenever the voltage signal is at one of the first and second voltage levels, and
      the shifted voltage signal of a third one of the data slicers is above the threshold whenever the voltage signal is at one of the second, third, and fourth voltage levels, and below the threshold whenever the voltage signal is at the fourth voltage level.

4. The optical receiver of claim 3,
   wherein the optical receiver front-end is to output a common mode voltage of the voltage signal, and
   the offset value set for the first one of the data slicers is the common mode voltage of the voltage signal plus a first amount,
   the offset value set for the second one of the data slicers is the common mode voltage of the voltage signal, and
   the offset value set for the third one of the data slicers is the common mode voltage of the voltage signal minus a second amount.

5. A computing device, comprising:
   processing circuitry;
   an optical transmitter configured to transmit, as a PAM-4 encoded optical signal, data-for-transmission received from the processing circuitry;
   an optical receiver configured to receive the transmitted PAM-4 encoded optical signal, the optical receiver comprising:
      a photodiode to convert the PAM-4 encoded optical signal into a photodiode output signal;

an optical receiver front-end comprising a transimpedance amplifier to convert the photodiode output signal to a voltage signal;
four slicers including three data slicers and one edge slicer, where each of the slicers is to:
shift the voltage signal based on an offset voltage set for the respective slicer,
determine whether the shifted voltage signal is greater than a threshold value and generate a number of comparison signals based on the determining, and
generate N digital signals by demuxing the comparison signals, where N>1;
wherein each of the slicers includes:
a voltage shifting amplifier to shift the voltage signal based on the offset voltage set for the respective sliver, and
a number of comparators to determine whether the shifted voltage signal is greater than the threshold, and
the comparators of the edge slicer use clock signals that are phase shifted relative to corresponding clock signals used by the comparators of each of the data slicers;
wherein each of the slicers includes two of the comparators,
the two comparators of each of the data slicers are controlled by a first clock and a second clock that is phase shifted 180 degrees from the first clock, and
the two comparators of the edge slicer are controlled by a third clock and a fourth clock, the third clock being phase shifted 90 degrees from the first clock, and the fourth clock being phase shifted 270 degrees from the first clock; and
a logic block that is to perform PAM-4 to binary decoding based on the 3N digital signals output by the data slicers and sense edge transitions for a clock-and-data-recovery process based on the N digital signals output by the edge slicer; and
a memory device to receive binary data output from the optical receiver.

6. The computing device of claim 5,
wherein the optical receiver front end includes:
automatic gain control circuitry that is to automatically control a gain of the transimpedance amplifier when the photodiode output signal is larger than a particular value, and
DC offset cancelation circuitry that is to cancel a DC voltage offset of the transimpedance amplifier that is due to a DC component of the photodiode output signal.

7. The computing device of claim 5,
wherein the voltage signal transitions between a first voltage level, a second voltage level that is higher than the first voltage level, a third voltage level that is higher than the second voltage level, and a fourth voltage level that is higher than the third voltage level, and
the respective offset values that are set for the data slicers are such that:
the shifted voltage signal of a first one of the data slicers is above the threshold whenever the voltage signal is at the fourth voltage level, and below the threshold whenever the voltage signal is at one of the first, second, and third voltage levels,
the shifted voltage signal of a second one of the data slicers is above the threshold whenever the voltage signal is at one of the third and fourth voltage levels, and below the threshold whenever the voltage signal is at one of the first and second voltage levels, and
the shifted voltage signal of a third one of the data slicers is above the threshold whenever the voltage signal is at one of the second, third, and fourth voltage levels, and below the threshold whenever the voltage signal is at the fourth voltage level.

8. An optical receiver, comprising:
an optical receiver front-end comprising a transimpedance amplifier to convert a photodiode output signal to a voltage signal, automatic gain control circuitry that is to control a gain of the transimpedance amplifier when the photodiode output signal is larger than a particular value, and DC offset cancelation circuitry that is to cancel a DC voltage offset of the transimpedance amplifier that is due to a DC component of the photodiode output signal;
four slicers including three data slicers and one edge slicer, where each of the slicers is to receive the voltage signal and output N digital signals based on the voltage signal, where N>1;
wherein each of the slicers includes:
a voltage shifting amplifier to shift the voltage signal based on an offset voltage that is set for the respective slicer,
a number of comparators to determine whether the shifted voltage signal is greater than a threshold and generate a number of comparison signals based on the determining, and
a number of demux stages to generate the N digital signals by demuxing the comparison signals, and
the comparators of the edge slicer use clock signals that are phase shifted relative to corresponding clock signals used by the comparators of each of the data slicers;
wherein each of the slicers includes two of the comparators,
the two comparators of each of the data slicers are controlled by a first clock and a second clock that is phase shifted 180 degrees from the first clock, and
the two comparators of the edge slicer are controlled by a third clock and a fourth clock, the third clock being phase shifted 90 degrees from the first clock, and the fourth clock being phase shifted 270 degrees from the first clock; and
a logic block that is to perform PAM-4 to binary decoding based on the 3N digital signals output by the data slicers and sense edge transitions for a clock-and-data-recovery process based on the N digital signals output by the edge slicer.

9. The optical receiver of claim 8,
wherein the voltage signal corresponds to a PAM-4 encoded signal that transitions between a first voltage level, a second voltage level that is higher than the first voltage level, a third voltage level that is higher than the second voltage level, and a fourth voltage level that is higher than the third voltage level, and
the first voltage level is higher than the second voltage level, which is higher than the third voltage level, which is higher than the fourth voltage level and
the respective offset values that are set for the data slicers are such that:
the shifted voltage signal of a first one of the data slicers is above the threshold whenever the voltage signal is at the fourth voltage level, and below the threshold whenever the voltage signal is at one of the first, second, and third voltage levels, the shifted voltage signal of a second one of the data slicers is above the threshold whenever the voltage signal is at one of the third and fourth voltage levels, and below the threshold whenever the voltage signal is at one of the first and second voltage levels, and the shifted voltage signal of a third one of the data slicers is above the threshold whenever the voltage signal is at one of the second, third, and fourth voltage levels, and below the threshold whenever the voltage signal is at the fourth voltage level.

* * * * *